United States Patent [19]

Ruppert, Jr.

[11] 4,035,546

[45] July 12, 1977

[54] STRIPPABLE ANTI-FOULING COVERING FOR MARINE STRUCTURES

[76] Inventor: Emile Ruppert, Jr., 880 Caldwell Ave., Union, N.J. 07083

[21] Appl. No.: 654,993

[22] Filed: Feb. 4, 1976

[51] Int. Cl.² .................... B32B 7/02; C03C 17/00
[52] U.S. Cl. ........................ 428/332; 106/15 R; 114/69; 156/71; 428/215; 428/335; 428/343; 428/354; 428/355
[58] Field of Search ............ 156/71; 114/69; 428/215, 335, 343, 332, 354–355; 106/15 AF, 15 R

[56] References Cited

U.S. PATENT DOCUMENTS

| | | | |
|---|---|---|---|
| 3,761,334 | 9/1973 | Zondex | 114/69 X |
| 3,845,005 | 10/1974 | Freiman | 106/15 AF R |
| 3,861,949 | 1/1975 | Onozuka et al. | 106/15 AF R |
| 3,892,699 | 1/1975 | Weisse | 106/15 AF R |
| 3,922,186 | 11/1975 | Segawa et al. | 428/354 |
| 3,990,381 | 11/1976 | Shepherd et al. | 106/15 R |

*Primary Examiner*—Thomas J. Herbert, Jr.
*Attorney, Agent, or Firm*—Silverman and Jackson

[57] ABSTRACT

A strippable covering for protecting marine structures from fouling in contact with water which comprises a sheet-like water-insoluble base prepared from a synthetic, thermoplastic polymeric material selected from the group consisting of polyvinyl acetate, polyvinyl chloride and polyethylene, said base ranging in thickness from 4 to 8 mils and coated on one side thereof with a water insoluble, acrylic adhesive material comprising homopolymers and copolymers of acrylic acid and acid esters, said adhesive material ranging in thickness from about 0.5 to 2 mils, said base coated on the opposite side thereof with an anti-foulant film-forming composition comprising a film-forming ingredient consisting of polyvinyl chloride and wood rosin present in the amount of 11–17% by weight, a pigment component comprising an anti-foulant including cuprous oxide, iron oxide, tin fluoride, and possibly other organometallic anti-foulant materials, said pigment further comprising as an anti-foulant ingredient an aromatic bituminous material of a resinous nature such as coal tar or the like, said pigment component present in an amount of about 52% by weight, a diluent or solvent selected from the group consisting of aromatic hydrocarbons, ketones and mixtures thereof, said solvent present in an amount of about 32% by weight and a plasticizer present in an amount of about 2% by weight, said plasticizer selected from the group consisting of tricresyl-phosphate, alkylphthalates, triphenyl phosphate and mixtures thereof. The covering of the present invention provides effective protection against corrosion and attack by marine organisms yet is easily removable at the end of a season before replacement with a like covering material without the need for costly and time-consuming scraping procedures.

9 Claims, No Drawings

STRIPPABLE ANTI-FOULING COVERING FOR MARINE STRUCTURES

BACKGROUND OF THE INVENTION

The present invention is directed to a device for the protection of surfaces exposed to marine environments, and is particularly related to the provision of coatings for marine structures which provide anti-foulant protection.

One of the major problems attending the maintenance of surfaces in contact with marine environments has been the prevention of incrustation and corrosion resulting from the attachment or other contact of marine plant and animal life thereto. Specifically, the growth of barnacles and other marine organisms has posed a significant maintenance problem, as the cleaning and removal of such incrustations comprises a costly, time-consuming procedure. As an attempt to reduce or otherwise ameliorate the difficulties attending the growth of such incrustations, anti-fouling coatings comprising materials known to be toxic to marine life have been applied in various manners to such structures as ships' hulls and the like. Specifically, such coatings have comprised sheets prepared from metals having known toxicity to marine life, such as copper and the like. Other approaches have comprised the employment of paint-like coatings incorporating within certain toxic ingredients.

In recent years, efforts to retard marine fouling have focused on the development of improved paint vehicles for dispersing the familiar toxic salts therein. Inasmuch as the most effective marine anti-fouling toxics are generally chemically insoluble in most useful paint vehicles, the toxic is either leached rapidly from the typical paint film, or the paint film is designed to expose the toxic to the sea water. In either case, the effective foul-free life is limited, and the cost of using such paints on an object such as a ship's hull or any permanently submerged object is exceedingly high.

Additionally, the conventional paint coatings tend to promote barnacle growth after the expiration of the toxic therefrom. Thus, when replacement and re-coating are required, an expensive maintenance schedule must be followed wherein the marine surface must first be scrapped or otherwise cleaned to provide the appropriate surface for a re-coating operation. The process of cleaning and re-coating the marine surface is extremely time-consuming and costly, as the marine growths develop on the painted surface in concentrations comparable to those encountered on uncoated surfaces.

The development of the aforenoted incrustations serves to degrade the surface of the particular structure, and in the case of sea-going vessels, tends to reduce the ability of the vessel to move efficiently in water with the result that additional cost in fuel and time are occasioned.

The employment of sheet-like coating is recognized in the prior art as an alternative to the provision of painted anti-fouling compositions. Specifically, U.S. Pat. No. 3,761,334, to Zondek discloses an anti-fouling sheet-like coating comprising a metal foil which is applied to the surface by a pressure-sensitive or heat-sensitive adhesive or the like. The Zondek coating is a permanent coating, as it is intended that the metal surface of the foil will indefinitely provide the desired anti-fouling capability. Although the Zondek sheet appears to provide anti-fouling protection, the additional weight occasioned by the provision of such a metal foil coating would appear to detract from the economic value of indefinite application, as the additional weight would result in higher costs of operation in the case of sea-going vessels, particularly of a commercial nature. Moreover, the provision of a metal coating of the nature disclosed in Zondek could, in the instance where the surfaces to be protected are prepared from metal, promote an active site of galvanic corrosion which could occasion repairs to said surfaces far exceeding the cost and effort involved in the removal of the marine growths sought to be prevented.

SUMMARY OF THE INVENTION

In accordance with the present invention, a strippable sheet-like covering for the protection of marine structures is disclosed which comprises a water-insoluble base prepared from a synthetic thermoplastic polymeric material selected from the group consisting of polyvinyl acetate, polyvinyl chloride and polyethylene. Said base ranges in thickness from 4 to 8 mils and is coated on one side with a water-insoluble pressure-sensitive acrylic adhesive material, and on the opposite side thereof, an anti-fouling composition comprising a film-forming ingredient present in an amount of from 11 to 17% by weight which consists of polyvinyl chloride and wood rosin, a pigment component present in an amount of approximately 52% by weight which comprises cuprous oxide, iron oxide, tin fluoride and an optional ingredient comprising an aromatic, bituminous resin such as coal tar or a derivative thereof, a diluent or extender component present in an amount of about 32% by weight which comprises aromatic hydrocarbons and ketones and mixtures thereof, and a plasticizer present in an amount of approximately 2% by weight which comprises tricresyl-phosphate, dialkylphthalates and triphenyl phosphate, said anti-fouling composition present in a thickness when dry of approximately 2 mils.

The covering of the present invention may be easily applied by simple pressure adhesion and is likewise easily removable without the requirement of further cleaning or scraping operations. Due to its thickness and composition, the covering of the present invention is of significantly reduced weight such that its addition to a moving marine structure adds little, if at all, to the cost of operation of said structure. Moreover, the coating containing the anti-fouling ingredient resists breakdown in aqueous environment and further affords corrosion protection to the underlying surface.

The covering of the present invention may be provided in large expanses of sheet-like material, or may alternatively be provided in rolls of indefinite length of strip. Application and removal of the covering are greatly simplified over corresponding procedures required with anti-foulant coatings of the prior art. Specifically, application of the present covering comprises the placement of said covering against the surface to be protected with the application of an effective amount of pressure to enable the pressure-sensitive adhesive to fully grip said surface. Likewise, removal comprises merely the grasping of a section of said covering followed by the even application of force to pull said covering away from said surface.

Accordingly, it is a principal object of the present invention to provide an anti-fouling covering for marine surfaces which is inexpensive and expeditious to employ.

It is a further object of the present invention to provide a covering as aforesaid which employs water-insoluble resinous materials combined with effective amounts of anti-fouling agents, in a readily removable form.

It is a yet further object of the present invention to provide a covering as aforesaid which eliminates the need for extensive scraping and cleaning of said surface between re-coating operations.

Other objects and advantages will become apparent to those skilled in the art from a consideration of the ensuing description.

DETAILED DESCRIPTION OF THE INVENTION

In accordance with the present invention, the foregoing objects and advantages are readily attained.

The present invention comprises an anti-foulant covering for the protection of marine structures which comprises a sheet-like, water-insuluble base prepared from a synthetic, thermoplastic, polymeric material selected from the group consisting of polyvinyl acetate, polyvinyl chloride and polyethylene. Said base ranges in thickness from 4 to 8 mils and is coated on one side with a water-insoluble, pressure-sensitive, acrylic adhesive material ranging in thickness from about 0.5 to 2 mils. Said base is coated on the opposite side thereof with an anti-foulant film-forming composition of a thickness of about 2 mils, said composition comprising a film-forming component present in an amount ranging from about 11 to about 17% by weight, said component consisting of wood rosin and polyvinyl chloride, a pigment component present in an amount of about 52% by weight, said pigment component comprising cuprous oxide, iron oxide, tin fluoride and an aromatic bituminous resin, an extender or diluent component present in an amount of about 32% by weight, said extender component comprising aromatic hydrocarbons and ketones and mixtures thereof, and a plasticizer component present in an amount of about 2% by weight, said plasticizer selected from the group consisting of tricresyl-phosphate, dialkylphthalates such as dibutylphthalate and dioctylaphthalate, and triphenylphosphate. The covering of the present invention is simply applied by placement against the surface to be protected followed by the application of mild pressure thereto. Removal of the covering is usually accomplished by simply grasping an available end thereof and pulling said covering away from said surface.

The covering of the present invention comprises a sheet-like, water-insoluble base. The base is generally prepared from a synthetic thermoplastic, polymeric material such as polyvinyl acetate, polyvinyl chloride and polyethylene. The base may be prepared in sheet-form or in the form of a strip of indefinite length. The aforenoted thermoplastic materials are well-known, and are commercially available such that their processing need not be repeated herein.

It is an important aspect of the present invention that the base material be water-insoluble, as prolonged exposure to aqueous environments occurs. The aforenoted polymeric materials may be employed as homopolymers or as copolymers with well known monomeric costituents, combinable therewith. The base is provided with and may range in thickness from about 4 to about 8 mils. The foregoing range of thicknesses has been found to be particularly useful in accordance with the present invention, as the requisite strength necessary to enable the rapid and effortless removal of the covering is a function of the minimum thickness of said base, while the maximum thickness has been determined to be desirable in accordance with acceptable weight limitations imposed upon coverings useful with moving marine vessels. The flexible nature of the base enables the covering of the present invention to withstand stresses of application and removal without fracture or breakage. Naturally, the base of the present invention may be provided in any suitable width or dimension within the purvue of its use. Thus, in applications involving structures and surfaces of reduced size, it is preferable to privide the base in a strip form, preferably wound upon itself in a roll. In the instance where larger structures are involved, the base of the present invention may be provided in appropriately-sized sheets which may be stored flat and later attached when needed. Naturally, the exact dimensions of the base of the present invention are not critical and do not per se form a material part of the present invention.

The flexible, water-insoluble base has united thereto on one surface thereof, a normally tacky and pressure-sensitive adhesive which enables the covering of the present invention to be attached or adhered to appropriate marine surfaces by pressing the covering thereagainst with said adhesive in contact therewith. The adhesive composition is non-offsetting in that it is possessed of such coherence in relation to adhesiveness and is so firmly united to the flexible base that the covering may be readily separated from surfaces to which it has been applied without offsetting of adhesive material. As in the case of the base, the adhesive material is preferably water-insoluble and is prepared from acrylic materials well known in the art for electrical applications and the like. Specifically, said acrylic materials comprise homopolymers and copolymers of acrylic acid and acrylic acid esters, including the methacrylic moiety. The adhesives are thermoplastic materials, and preferably possess a Brookfield viscosity in the range of 115 centipoise measured with a No. 2 spindle at 30 RPM. The adhesive is provided in a thickness ranging generally from about 0.5 to 2 mils, and preferably from about 1 to 2 mils. By virtue of its aforementioned properties, the adhesive employed with the covering of the present invention enables the covering the remain stationary throughout the term of its use, and further prevents the ingress of moisture to cause corrosion or other degradation of the surface to be protected.

In accordance with the invention, the outer surface of the water-insoluble base is covered with an anit-fouling composition to a dry thickness of up to 2 mils. Said antifouling composition is uique in that it provides consistent, effective protection against the growth of incrustations resulting from marine exposure. As noted earlier the antifouling composition of the present invention comprises a film-forming component present in an amount ranging from about 11 –17% by weight. The film-forming component is comprised of polyvinyl chloride and wood resin and, in a preferred embodiment, said wood rosin and said polyvinyl chloride are present in the ratio of 2 to 1. The employment of wood rosin in the aforementioned amounts is significant, as wood rosin possesses anti-fouling properties.

The anti-fouling composition on further contains a pigment component in an amount of approximately 52% by weight. Said pigment component comprises a combination of cuprous oxide, iron oxide and tin fluoride, in an amount of approximately 98%, with a 2% of inert materials also present. The pigment component may additionally contain other well- known anti-fouling ingredients such as the organo-metallics including the organo-tin compounds.

A particular feature of the present invention comprises an optional addition to the pigment component of a low-molecular weight bituminous resinous material, such as a coal tar or coal tar derivative. In accordance with the present invention, it has been unexpectedly found that the bituminous resin serves to ward off certain marine life by virtue of an odorous essence emitted thereby. Primarily, it appears that the essence of coal tar and the like is objectionable to certain marine life, and that, accordingly, certain inhibitor properties are gained simply byk the employment of said bituminous resin.

In addition to the pigment component, the anit-fouling composition employed in accordance with the present invention contains a diluent or extender component in an amount of about 32% by weight which is comprised of aromatic hydrocarbons, ketones and mixtures thereof. Further, a plasticizer component is included in an amount of about 2% by weight which generally comprises one or more materials such as tricresyl-phosphate, dialkylphthalates such as dibutylphthalate and dioctylphthalate, and triphenyl phosphate. All of the foregoing plasticizer materials are conventional in the art for compositions of this type.

In accordance with foregoing percentages recited above, the anti-fouling composition of the present invention is seen to possess a total of about 60 percent non-volatile constituents, including plasticizers, pigments an extenders. The pressure-sensitive acrylic adhesive and the anti-fouling composition may be applied to the flexbile base by one of many conventional techniques. Thus, depending upon their consistency, they may be applied by dipping, rolling, melting and spreading with a doctor knife, or the like, by calendering or frictioning, spraying, brushing or in any other known manner.

As previously note, the covering of the present invention provides extended anti-fouling protection together with improved corrosion resistence, as the water-insoluble adhesive in combination with the water-insoluble flexible base prevents the ingress or seepage of any moisture therethrough. Moreover, the anit-fouling material contained within the anti-fouling composition, is released in steady, effective amounts to prolong the activity of the covering for a period of time which may extend to from 6 to 7 months or more, depending upon geographical location. In a preferred embodiment, the toxic ingredient present in the anti-fouling composition of the present invention comprises a combination of copper salts, including cuprous oxide and copper disulphide, $Cu_3S_2$, together with various other metal oxides, tin fluroide, and the coal tar derivative aforementioned. These ingredients act in concert to provide an unexpectedly and prolonged toxic effect which is evidenced by the greatly reduced incidence of marine growths on the surface thereof.

A further and most important feature of the present invention comprises the ease of handling of the present covering. Particularly, the covering of the present invention is easily applied to a marine surface by simple placement thereagainst with the application of simultaneous pressure. The pressure-sensitve adhesive readily adheres to the marine surface and actually requires a very slight pressure, which may be applied by hand or with roller means or the like. Removal of the cover is equally expeditious and is accomplished by simply prying up one portion thereof and thereafter applying gentle tension to cause the remaining material to separate from the marine surface. As noted eariler, the adhesive employed in the present invention is non-offsetting and, accordingly the surface is completely clean and ready for the immediate application of a fresh cover layer. In the preferred practice of the present invention, the sequence of removal of the spent covering and replacement with fresh material is conducted within a short period of time to prevent the occurrence or development of any corrosion on said surface. Of course, in the instance where a surface is being covered for the first time which has previously been painted or otherwise coated, it is advisable and, in fact, necessary that said surface be throughly cleaned by scraping and the like to remove all surface coating and contaminants before the application of the covering of the present invention is conducted.

A techinque which has been found to be particularly useful in the application of the covering of the present invention comprises the placement of sections of said covering in overlapping relation with respect to each other whereby the edge of said material residing at lower depth is overlapped by the next lowest section of material applied to said surface. In the context of the placement of the coating of the present invention in strip form on a small boat, it can be visualized that the first strip applied extends horizontally about the side of the boat about two to three inches above the water line. The next strip is applied below the first strip and in overlapping relation with respect to the lower edge thereof. Successive strips are thus applied on all sides of the boat until the lowermost or bottom strip is reached. This lowermost strip is started at the bow of the boat and extends down so as to overlap the central bottommost segments and to ride up the stern beyond the water line. The above description is merely provided as representative of a general technique which may be employed in the placement of the covering of the present invention on any marine structures, and should not be construed as limitative of the application of the present invention. Though the description has proceeded with reference to boats, ships and the like, it is contemplated that other marine structures such as piers, pilings, etc., may be appropriately surfaced and thereafter coated with the covering of the present invention to enable reduced maintenance costs of such structures.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A strippable covering for the protection of marine structures from fouling in contact with water which consists essentially of a sheet-like, water-insoluble base prepared from a synthetic, thermoplastic, polymeric material selected from the group consisting of polyvinyl acetate, polyvinyl chloride and polyethylene, ranging in thickness from 4 to 8 mils said base coated on one side thereof with a water insoluble, pressure-sensitive acrylic adhesive material comprising homopolymers ad copolymers of acrylic acid and acrylic acid esters, ranging in thickness from about 0.5 to about 2 mils, said base coated on the opposite side thereof with an anti-foulant composition comprising a film-forming component in an amount ranging from about 11 to about 17% by weight, said film-forming component comprising wood rosing and polyvinyl chloride, a pigment component in an amount of about 52% by weight, said pigment component comprised of metal oxide salts having anti-foulant activity in an amount of 98% of said pigment component, an extender component present in about 32% by weight, said extender component comprising aromatic hydrocarbons and ketones, and a plasticizer component present in an amount of about 2% by weight, wherein all percentages by weight are determined with reference to said anti-foulant composition, and wherein said anti-foulant composition is provided in a thickness, when dry of about 2 mils.

2. The covering of claim 1 wherein said pigment further comprises an aromatic bituminous resin of low molecular weight.

3. The covering of claim 1 wherein said base comprises polyvinyl acetate.

4. The covering of claim 1 wherein said adhesive comprises a homopolymer of acrylic acid.

5. The covering of claim 1 wherein said adhesive comprises a copolymer of acrylic acid and an alkylacrylate.

6. The covering of claim 1 wherein said adhesive is provided in a thickness ranging from 1 to 2 mils.

7. The covering of claim 1 wherein said film-forming component comprises wood rosin and polyvinyl chloride in a ratio with respect to each other of 2 to 1.

8. The covering of claim 1 wherein said pigment component comprises a mixture of a copper salt, iron oxide, tin fluoride and organo tin compound, said plasticizer is selected from the group consisting of tricresylphosphate, dibutylphthalate, dioctylphthalate, diphenylphospate, and mixtures thereof, and said base comprises polyvinyl chloride.

9. The covering of claim 8 wherein said copper salts comprise cuprous oxide and copper disulphide.

* * * * *